(12) United States Patent
Wang

(10) Patent No.: US 10,341,579 B2
(45) Date of Patent: Jul. 2, 2019

(54) CAMERA SYSTEM INCLUDING LENS WITH MAGNIFICATION GRADIENT

(71) Applicant: GOOGLE LLC, Mountain View, CA (US)

(72) Inventor: Li-Ping Wang, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/053,273

(22) Filed: Aug. 2, 2018

(65) Prior Publication Data

US 2018/0367743 A1 Dec. 20, 2018

Related U.S. Application Data

(63) Continuation of application No. 15/464,099, filed on Mar. 20, 2017, now Pat. No. 10,051,201.

(51) Int. Cl.
| | |
|---|---|
| H04N 5/262 | (2006.01) |
| G02B 13/00 | (2006.01) |
| G02B 13/02 | (2006.01) |
| G02B 13/06 | (2006.01) |
| H04M 1/02 | (2006.01) |
| H04N 5/225 | (2006.01) |
| H04N 5/232 | (2006.01) |

(52) U.S. Cl.
CPC ......... *H04N 5/2628* (2013.01); *G02B 13/001* (2013.01); *G02B 13/02* (2013.01); *G02B 13/06* (2013.01); *H04M 1/0202* (2013.01); *H04M 1/0264* (2013.01); *H04N 5/2258* (2013.01); *H04N 5/23296* (2013.01); *H04M 2250/52* (2013.01)

(58) Field of Classification Search
CPC .................................................. H04N 5/23296
USPC ......................................... 348/240.99, 240.3
See application file for complete search history.

(56) References Cited

U.S. PATENT DOCUMENTS

| | | | |
|---|---|---|---|
| 8,547,423 B2 | 10/2013 | Ning | |
| 9,025,077 B2 | 5/2015 | Attar et al. | |
| 9,225,889 B1 | 12/2015 | Korkin | |

(Continued)

FOREIGN PATENT DOCUMENTS

| | | |
|---|---|---|
| EP | 2005234 A1 | 12/2008 |
| WO | WO 2007/120370 | 10/2007 |
| WO | WO 2009/1519003 | 12/2009 |

OTHER PUBLICATIONS

International Search Report and Written Opinion issued in International Application No. PCT/US2017/057500, dated Jan. 22, 2018, 16 pages.

(Continued)

*Primary Examiner* — Anthony J Daniels
(74) *Attorney, Agent, or Firm* — Fish & Richardson P.C.

(57) ABSTRACT

Embodiments are disclosed of an apparatus including a first digital camera with an image sensor optically coupled to a first lens, the first lens having a first magnification and a second digital camera including an image sensor optically coupled to a second lens. The second lens the second lens has a magnification that is greater than the magnification of the first lens and the second lens is a non-rectilinear lens having a magnification gradient in which magnification is highest at the center of the second lens and lowest at the edges. Other embodiments are disclosed and claimed.

14 Claims, 7 Drawing Sheets

(56) References Cited

U.S. PATENT DOCUMENTS

| | | | |
|---|---|---|---|
| 2004/0095470 A1* | 5/2004 | Tecu | H04N 5/2628 |
| | | | 348/207.99 |
| 2008/0043116 A1 | 2/2008 | Lappi et al. | |
| 2010/0328471 A1* | 12/2010 | Boland | G02B 13/004 |
| | | | 348/207.99 |
| 2014/0071329 A1 | 3/2014 | Richardson | |
| 2014/0253677 A1 | 9/2014 | Chen | |
| 2014/0300644 A1 | 10/2014 | Gillard et al. | |
| 2017/0278263 A1* | 9/2017 | Tanaka | H04N 5/23206 |
| 2018/0007276 A1* | 1/2018 | Ollila | H04N 5/23293 |

OTHER PUBLICATIONS

Sunsex Ultra Wide-Angle Lens—DSL221A Downloaded Aug. 3, 2016, 2 pages.

Sunsex. "Technology Highlights" Downloaded Aug. 3, 2016, 4 pages.

PCT Written Opinion issued in International Application No. PCT/US2017/057500, dated Jan. 31, 2019, 5 pages.

\* cited by examiner

CAMERA SYSTEM INCLUDING LENS WITH MAGNIFICATION GRADIENT

CROSS-REFERENCE TO RELATED APPLICATION

This application is a continuation application of U.S. application Ser. No. 15/464,099, filed Mar. 20, 2017, which is incorporated by reference.

TECHNICAL FIELD

The disclosed embodiments relate generally to cameras and in particular, but not exclusively, to multi-camera systems including a lens with a magnification gradient.

BACKGROUND

Two-camera systems of the kind found in the newest smartphones have a pair of digital cameras facing the same direction. Each camera has a different lens: one camera has a lens with a short focal length, the other a lens with a long focal length. For instance, in some two-camera arrangements the short-focal-length lens can be a regular or wide-angle lens and the long-focal-length lens can be a telephoto lens with a 3× magnification compared to the wide-angle lens (i.e., if we designate the magnification of the regular or wide-angle lens to be 1×, the telephoto has triple the overall magnification, or 3×).

By themselves, these two-camera arrangements allow a user to capture only a wide-angle (1×) image or a telephoto (3×) image, and nothing in between. But what if the user wants to capture an image at an intermediate magnification that falls in between the two lens magnifications—say a 2× image in a system with 1× and 3× lenses? The focal lengths of the two lenses are fixed and cannot be changed, so true optical zoom cannot be implemented to create the 2× image. Nonetheless, to simulate optical zoom, images can be captured with both the 1× and 3× lenses and the captured digital images can be fused by known software methods to create an image that is substantially what would result if it was in fact possible to adjust the magnification of one of the lenses to 2×.

Problems arise with this simulated optical zoom if the difference in focal length between the short-focal-length lens and the long-focal-length lens becomes too large. In these situations, the algorithms that fuse images with different magnifications to form an image with a desired intermediate magnification have a difficult time creating a good image at the intermediate magnifications.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF EMBODIMENTS

Embodiments are described of an apparatus, system and method for multi-camera systems including a lens with a magnification gradient. Specific details are described to provide an understanding of the embodiments, but one skilled in the relevant art will recognize that in some instances the invention can be practiced without one or more of the described details and in other instances the invention can be practiced with other methods, components, materials, etc. In some instances, well-known structures, materials, or operations are not shown or described in detail but are nonetheless within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments.

Figure 1A:
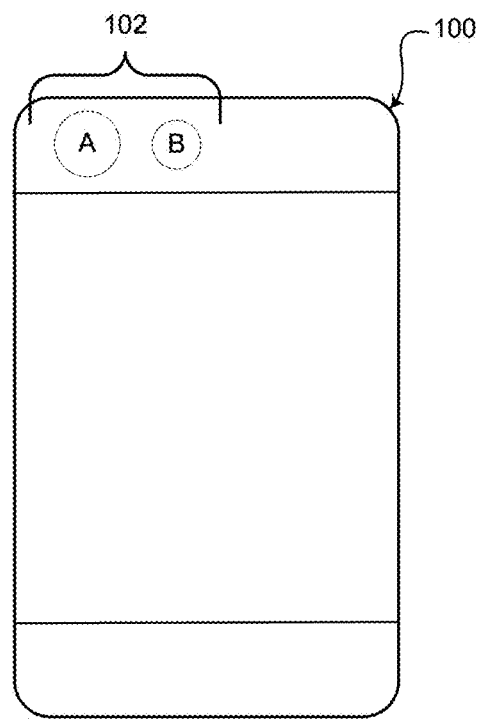
FIG. 1A is a plan view of the back side of an embodiment of a smartphone that includes a two-camera system.

FIG. 1A illustrates an embodiment of multi-camera system in a smartphone 100. Smartphone 100 includes two digital cameras facing the same direction so that they can both simultaneously capture images of the same scene. The illustrated embodiment includes two camras—a first camera A and a second camera B—but other embodiments it can include more than two cameras. Cameras A and B are positioned side-by-side in smart phone 100, but could be positioned differently in other embodiments. Moreover, in still other embodiments the multiple cameras can be included in a device that is not a smart phone, for instance a dedicated digital camera, and can include more than two cameras.

Figure 1B:
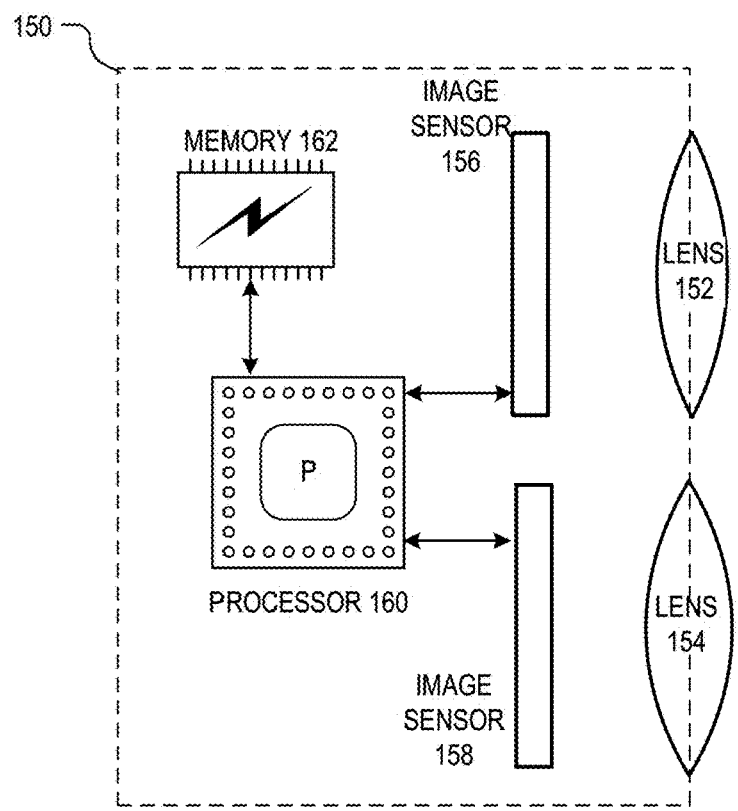
FIG. 1B is a block diagram of an embodiment of a two-camera system that can be used with a smartphone as shown in FIG. 1A.

FIG. 1B illustrates, in block diagram form, an embodiment of a two-camera system 150 that can be used in a multi-camera system such as smartphone 100. Camera A includes a first lens 152 and first image sensor 156, while camera B includes a second lens 154 and a second image sensor 158. Lens 152 is sometimes also referred to below as lens A, since it corresponds to camera A, and lens 154 is similarly sometimes referred to as lens B since it corresponds to camera B. Lenses 152 and 154 have different focal lengths, meaning that they have different magnifications, since magnification is related to focal length as follows for a single lens:

$$M = \frac{f}{f - d_o}$$

Where M is the magnification, f is the focal length, and $d_o$ is the object distance. In one embodiment lens 152 can be a regular or wide-angle lens and lens 154 can be a telephoto lens. Generally, the magnification of first lens 152 is less than the magnification of second lens 154 or, put differently, the focal length of lens 152 is shorter than the focal length of second lens 154. For instance, in one particular embodiment lens 152 can be a 1× lens and lens 154 can be a 3× lens. But in other embodiments, lens 152 can have a magnification between 1× and 5× and lens 154 can have a magnification between 2× and 10× or greater.

Two-camera system 150 also includes a processor 160 and a memory 162. In the illustrated embodiment, cameras A and B share a single processor and memory. In other embodiments cameras A and B can have separate processors that share a memory or separate processors with separate memories, although in such embodiments the processors, the memories, or both, could be communicatively linked to each other to allow one or both processors to fuse images captured by the cameras with known image fusion methods.

Figure 2A:
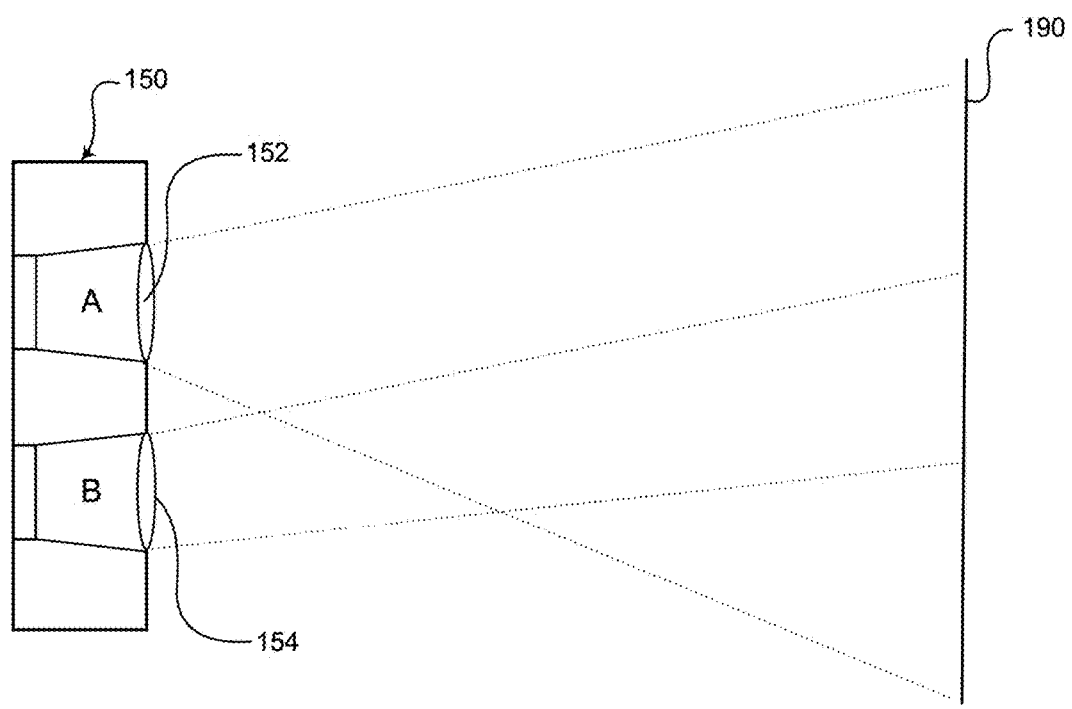
FIG. 2A is a top view of an embodiment of a two-camera system illustrating the field of view of the lenses and their capture of a scene.

FIG. 2A illustrates the use of the first camera A and second camera B to capture images of a scene 190. Camera A, whose lens has lower magnification and therefore a wider field of view (approximately 90° in one embodiment), captures all of scene 190. Camera B, whose lens 154 has a higher magnification and therefore a narrower field of view (approximately 30° for a 3× embodiment; approximately 9° for a 10× embodiment, and so on), captures only part of scene 106 but at a higher magnification than camera A. The digital images produced by both cameras are substantially the same size as measured by image size and pixel count, but because camera B captures a smaller part of the scene it will have greater spatial resolution.

Figure 2B:
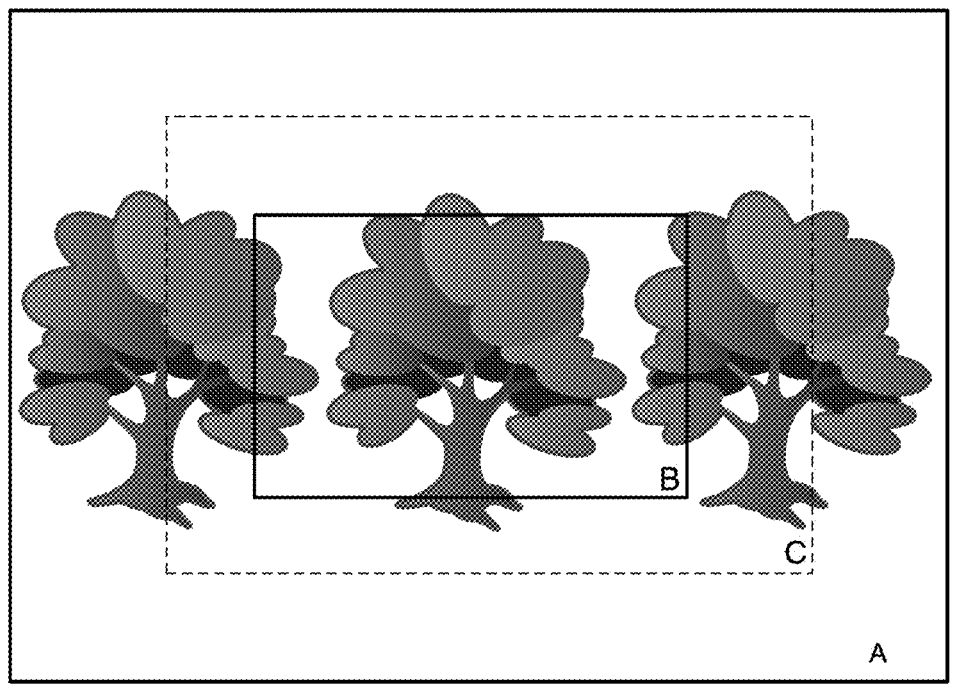
FIGS. 2B-2C are views of an image capture at the magnifications of the two lenses in a multi-camera system and an image at an intermediated magnification.
Figure 2C:
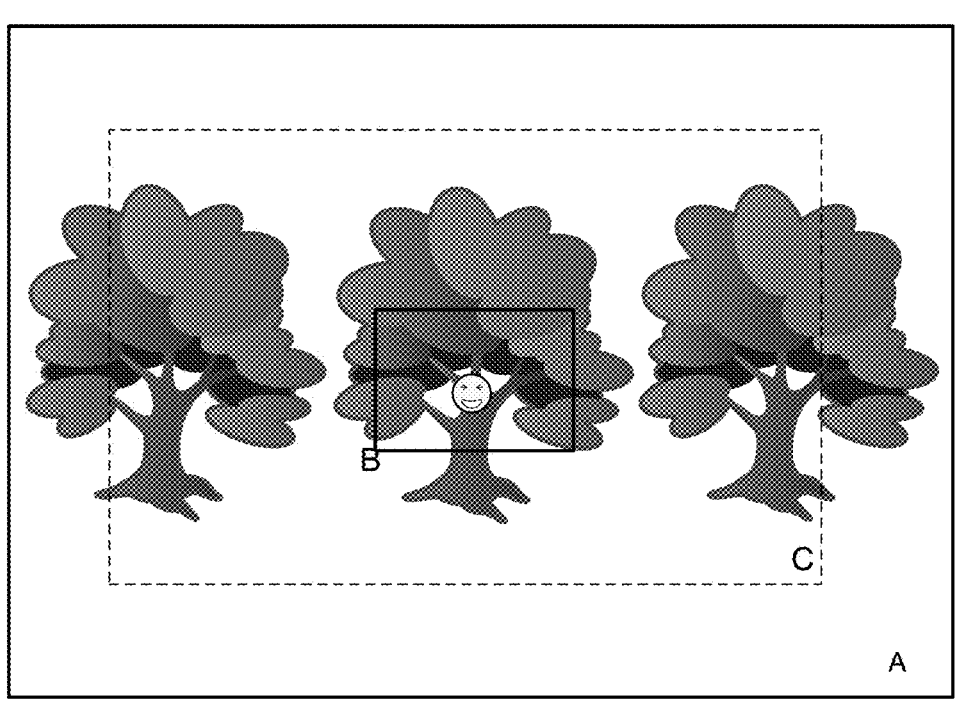

FIGS. 2B-2C illustrate images captured by camera 150. More specifically, they illustrate the scene coverage areas of cameras A and B. FIG. 2B shows the scene coverage with one set of magnifications for cameras A and B—1× for camera A and 3× for camera B, for instance. First camera A captures the entire scene at 1× magnification, but because it has a higher magnification second camera B captures a smaller portion of the scene.

FIG. 2C illustrates the scene coverage of cameras A and B if the magnification of lens B is increased compared to FIG. 2B. If FIG. 2B shows camera B with a 3× lens, FIG. 2C might show camera B with a 5× or 10× lens. The net result is that camera B's scene coverage is substantially smaller. This gap or delta in scene coverage—and, by extension, image resolution—makes it more difficult to create an image with intermediate magnification C, and the bigger the delta in scene coverage the more difficult it is. In both FIGS. 2B and 2C, digital images A and B can be fused with known techniques to create a digital image see at an intermediate magnification C between A and B. But if the difference in magnification between lenses A and B becomes larger difference in spatial resolution of the two images becomes correspondingly larger. As a result, it becomes more difficult to fuse the two images to form image C at an intermediate magnification. The higher the higher the ΔM is between cameras A and B, the more unsatisfactory the image will be at an intermediate map magnification C.

Figure 3A:
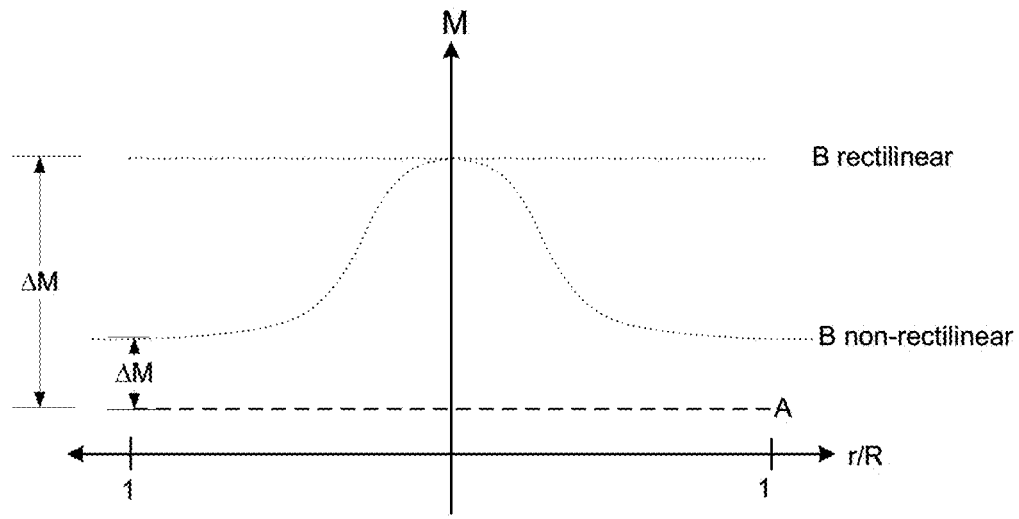
FIG. 3A is a graph showing an embodiment of a magnification distribution in a two-camera system in which one of the two lenses is rectilinear and the other lens is non-rectilinear.

FIG. 3A illustrates the distribution of magnification in an embodiment of a multi-camera system. The graph plots magnification M along the vertical axis against normalized radius (r/R) along the horizontal axis. In the illustrated embodiment, camera A has a rectilinear lens and camera B has a non-rectilinear lens. Rectilinear lenses are lenses that magnify the same amount over the entire area of the lens and hence produce no radial distortion. In the illustrated embodiment lens A is rectilinear, so its magnification is constant with radius. But lens B is non-rectilinear, meaning that its magnification varies with radius or, put differently, lens B has a magnification gradient between its center and its edges. Because the magnification gradient of lens B will create optical distortion, another way to describe this magnification is to say that lens B has pre-distortion.

In the illustrated embodiment, lens B has its peak magnification at its center and the magnification decreases non-linearly and monotonically from the center to the edges of the lens, but in other embodiments the magnification gradient need not be non-linear or monotonic. For comparison, the graph also shows the magnification of a rectilinear version of lens B with a magnification equal to the peak magnification of the non-rectilinear version. Generally, the magnification of lens A is less than the average magnification of lens B or, put differently, the focal length of lens A is shorter than the average focal length of lens B. As can be seen in the graph, if lens B has a magnification gradient, even with a high peak magnification at the center, the average ΔM between lenses A and B is lower than if both lenses were rectilinear with lens B at the peak ΔM. The ΔM at the edges of the lenses—and hence the edge of the resulting image—is also substantially lower. Both these characteristics make it easier to achieve a satisfactory image at an intermediate magnification using known image-fusion techniques. The exact magnification distribution of lens B can be determined experimentally or numerically, and can be chosen to optimize the performance of known image fusion methods.

Figure 3B:
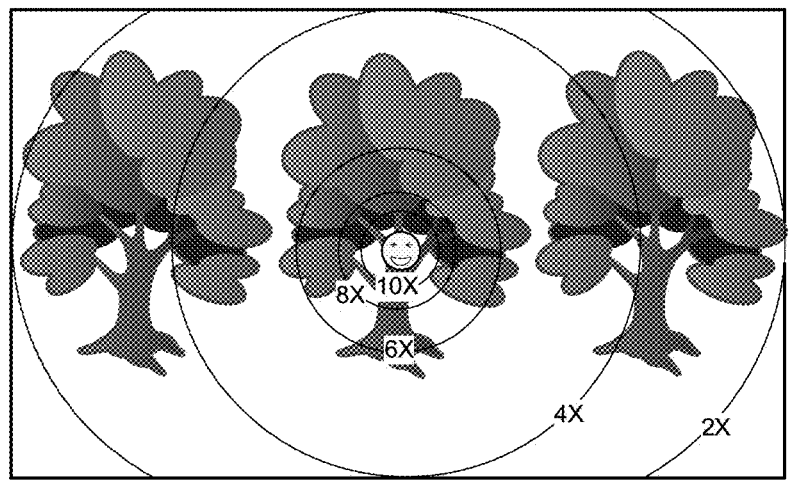
FIG. 3B is a view of an image showing magnification contours for a non-rectilinear lens with an embodiment of a magnification distribution as shown in FIG. 3A.

FIG. 3B illustrates an embodiment of magnification contours over an image capture area of lens B. In the illustrated embodiment the magnification contours of the image capture area can correspond to the magnification distribution shown in FIG. 3A. The magnification gradient will result in some image distortion because the lens is non-rectilinear, but the distortions can be taken out of the resulting image using software techniques.

Figure 3C:
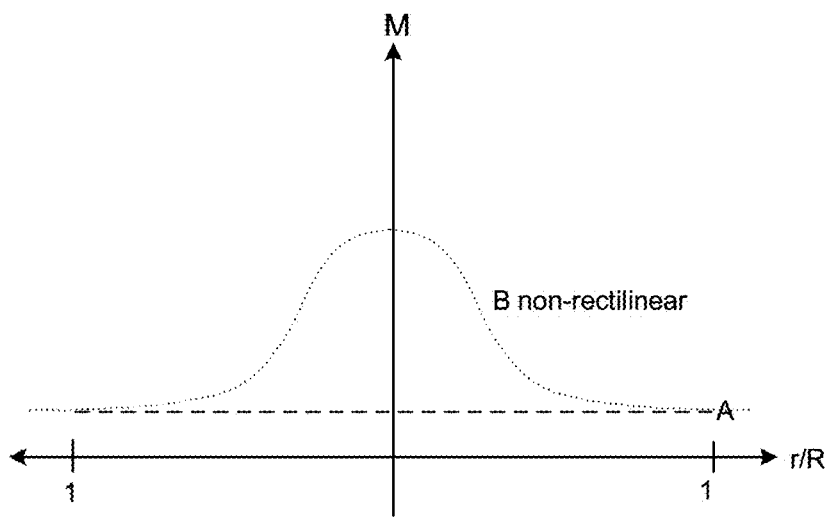
FIGS. 3C-3D are graphs showing other embodiments of magnification distributions in a two-camera system in which one of the two lenses is rectilinear and the other lens is non-rectilinear.
Figure 3D:
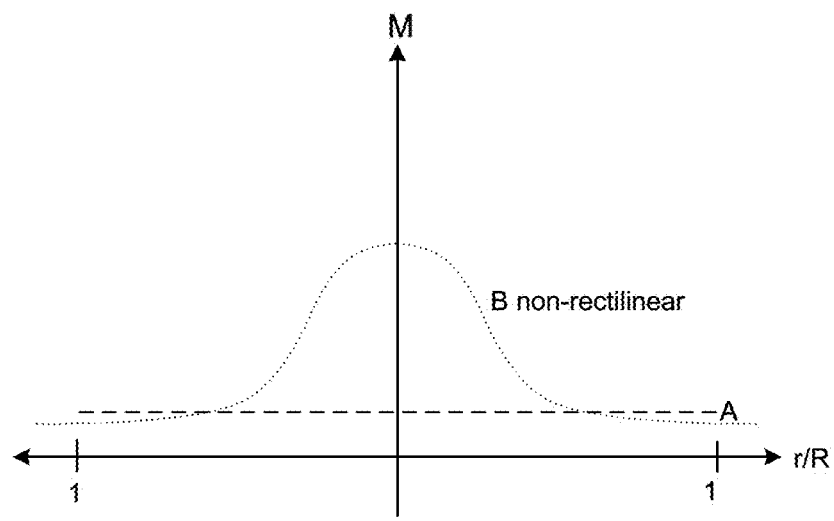

FIGS. 3C-3D illustrated other possible combinations of magnification distributions. As in FIG. 3A, both graphs plot magnification M along the vertical axis against normalized radius (r/R) along the horizontal axis, and as also as in FIG. 3A lens A is rectilinear and lens B is non-rectilinear. The primary difference between FIGS. 3C-3D and FIG. 3A is that the magnification distribution of lens B is shifted down to match or overlap the magnification of lens A at or near the edges. FIG. 3C shows the case where the magnifications match at the edges—that is, where ΔM=0 at the edges of lens. FIG. 3D shows the case where the magnifications overlap at the edges—that is, where ΔM<0 at the edges of lens.

Figure 4:
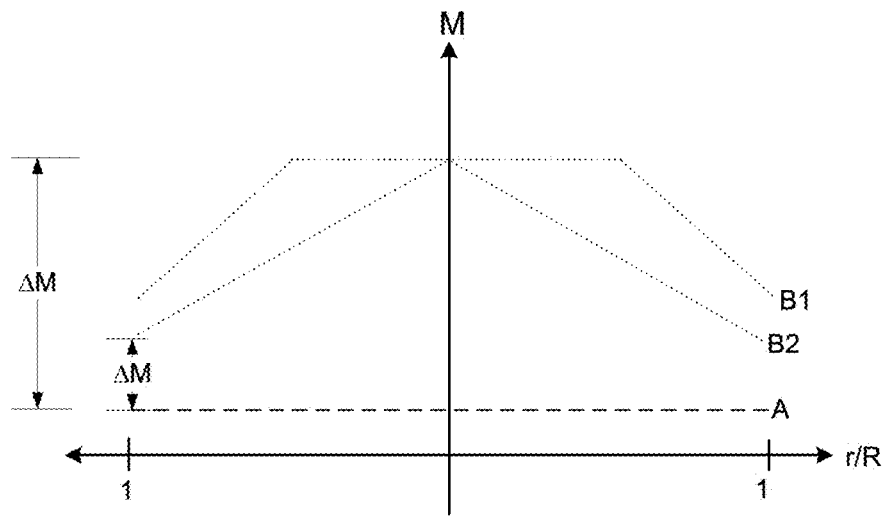
FIG. 4 is a graph showing other embodiments of magnification distribution in a two-camera system in which one of the two lenses is rectilinear and the other lens is non-rectilinear.

FIG. 4 illustrates other embodiments of magnification distributions for lens B. Magnification distribution B1 includes a middle section of constant magnification in the region surrounding the middle of the lens (i.e., centered on the optical axis of the lens), with a linear and monotonic decline in magnification between the constant-magnification middle section and the edges of the lens. Magnification distribution B2 has a maximum magnification at the center of the lens; the magnification then declines linearly and monotonically to the edge of the lens.

Figure 5:
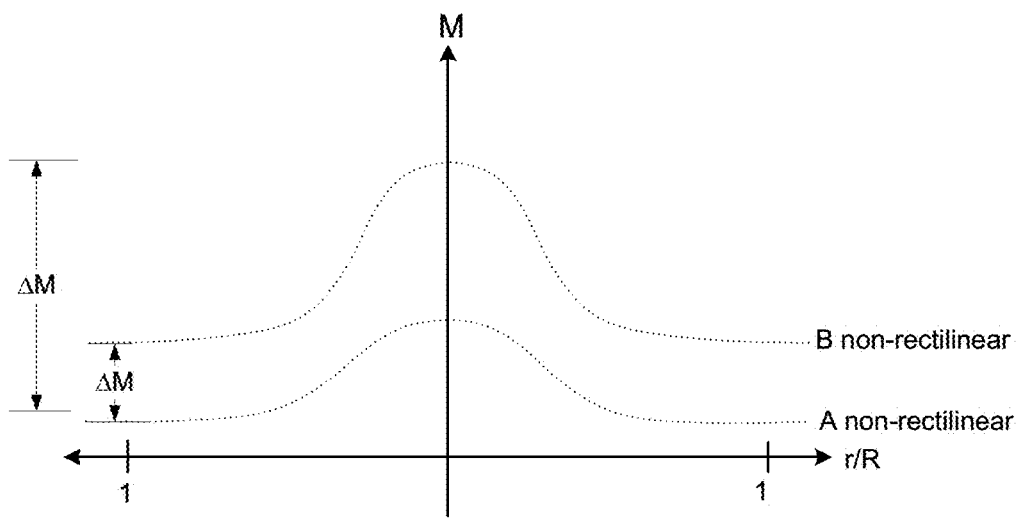
FIG. 5 is a graph showing other embodiments of magnification distribution in a two-camera system in which the two lenses are non-rectilinear.

FIG. 5 illustrates yet another embodiment of magnification distribution in a two-camera system. In the previously-discussed two-camera systems one of the lenses is rectilinear and the other lens is not—i.e., one has constant magnification and the other has a magnification gradient. But that need not be the arrangement in every embodiment. FIG. 5, for instance, illustrates magnification distributions for the lenses in a two-camera system in which both lenses are non-rectilinear. In the illustrated embodiment, both lenses A and B have similarly-shaped magnification distributions, but that need not be the case in every embodiment. In another embodiment, for instance, lens B can have the magnification distribution shown, while lens A can have a linear magnification distribution such as distributions B1 or B2 shown in FIG. 4. Their respective magnification gradients can be chosen to allow images to be successfully fused to simulate an intermediate magnification.

Figure 6:
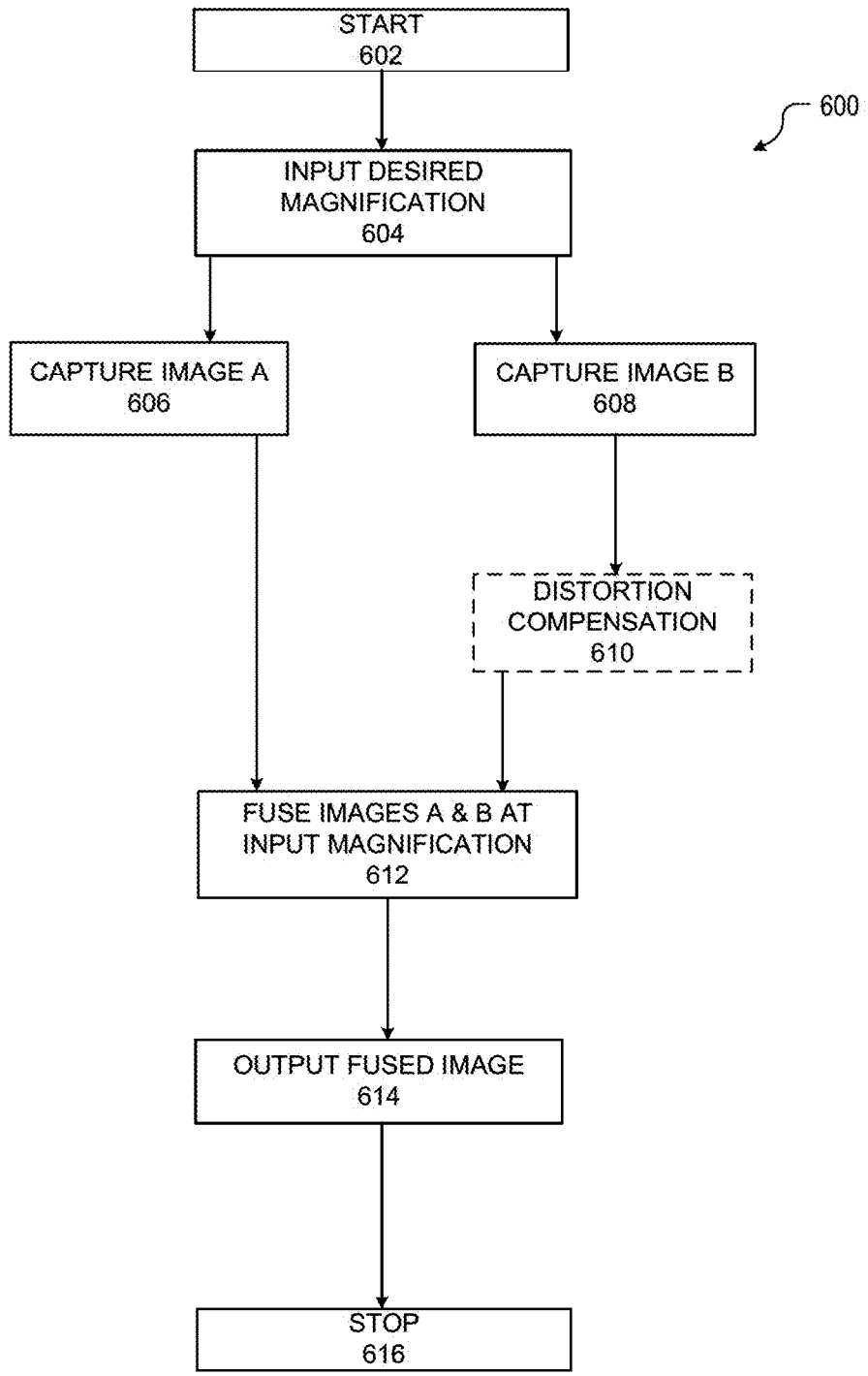
FIG. 6 is a flowchart of an embodiment of a process for producing fused images with a two-camera system at an intermediate magnification between the magnification of a first lens and the magnification of a second lens.

FIG. 6 illustrates an embodiment of a process for capturing and fusing a pair of images captured by a two-camera system including camera A with a rectilinear lens A and camera B, which includes a non-rectilinear lens with a magnification gradient between its center and its edges.

The process starts a block 602. A block 604, the desired magnification is input. For instance, if one of the lenses in the two-camera system is a 1× lens and the other is a 10× lens, but the user requires or desires a 5× image, the 5× is specified by the user at block 604. At block 606 image A is captured by camera A, and at block 608 image B is captured by camera B.

A block 610, which is optional as shown by its dashed outline, some distortion compensation on image B can take place to account for the image distortion created by the magnification gradient. At block 612, image B—with distortion compensation if applied at block 610, without distortion compensation if not—is fused with image A at the desired input magnification using known image fusion methods. At block 614 the fused image is output, and a block 616 the process stops.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

The terms used in the following claims should not be interpreted to limit the invention to the specific embodiments disclosed in the specification and the claims. Rather, the scope of the invention is to be determined entirely by the following claims, which are to be interpreted using established claim interpretation doctrines.

What is claimed is:

1. A method comprising:
   capturing a first digital image with a first digital camera including an image sensor optically coupled to a first lens, the first lens (i) being a non-rectilinear lens, and (ii) having a first magnification gradient exhibiting a peak magnification at a center of the first lens and a lowest magnification at edges of the first lens;
   capturing a second digital image with a second digital camera including an image sensor optically coupled to a second lens, the second lens (i) being a non-rectilinear lens, and (ii) having a second magnification gradient exhibiting a peak magnification at a center of the second lens and a lowest magnification at edges of the second lens, wherein the second magnification gradient of the second lens is greater than the first magnification gradient of the first lens; and
   fusing the first digital image with the second digital image to create a third digital image.

2. The method of claim 1, wherein the second magnification gradient of the second lens is linear.

3. The method of claim 2, wherein the second magnification gradient decreases monotonically from the center of the second lens to the edges of the second lens.

4. The method of claim 1, wherein the second magnification gradient of the second lens is non-linear.

5. The method of claim 4, wherein the second magnification gradient decreases monotonically from the center of the second lens to the edges of the second lens.

6. The method of claim 4, wherein a magnification at an edge of the second lens is equal to or less than a magnification at an edge of the first lens.

7. The method of claim 1, comprising applying distortion compensation to the second digital image before the second digital image is fused with the first digital image to create the third digital image.

8. A system comprising one or more computers and one or more storage devices storing instructions that are operable, when executed by the one or more computers, to cause the one or more computers to perform operations comprising:
   capturing a first digital image with a first digital camera including an image sensor optically coupled to a first lens, the first lens (i) being a non-rectilinear lens, and (ii) having a first magnification gradient exhibiting a peak magnification at a center of the first lens and a lowest magnification at edges of the first lens;
   capturing a second digital image with a second digital camera including an image sensor optically coupled to a second lens, the second lens (i) being a non-rectilinear lens, and (ii) having a second magnification gradient exhibiting a peak magnification at a center of the second lens and a lowest magnification at edges of the second lens, wherein the second magnification gradient of the second lens is greater than the first magnification gradient of the first lens; and
   fusing the first digital image with the second digital image to create a third digital image.

9. The system of claim 8, wherein the second magnification gradient of the second lens is linear.

10. The system of claim 9, wherein the second magnification gradient decreases monotonically from the center of the second lens to the edges of the second lens.

11. The system of claim 8, wherein the second magnification gradient of the second lens is non-linear.

12. The system of claim 11, wherein the second magnification gradient decreases monotonically from the center of the second lens to the edges of the second lens.

13. The system of claim 11, wherein a magnification at an edge of the second lens is equal to or less than a magnification at an edge of the first lens.

14. The system of claim 8, wherein the operations comprise applying distortion compensation to the second digital image before the second digital image is fused with the first digital image to create the third digital image.

\* \* \* \* \*